United States Patent
Ma

(10) Patent No.: US 6,681,751 B1
(45) Date of Patent: Jan. 27, 2004

(54) ENGINE WITH CONTROLLED AUTO-IGNITION

(75) Inventor: Thomas Tsoi Hei Ma, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 10/064,509

(22) Filed: Jul. 23, 2002

(51) Int. Cl.$^7$ .......................... F02D 41/30; F02D 45/00
(52) U.S. Cl. .................. 123/676; 123/481; 123/198 F; 123/90.15
(58) Field of Search ................. 123/676, 481, 123/198 F, 90.15, 305, 295, 299; 60/276, 277

(56) References Cited

U.S. PATENT DOCUMENTS

| | | | |
|---|---|---|---|
| 4,134,261 A | * 1/1979 | Iizuka et al. | 60/276 |
| 4,274,373 A | * 6/1981 | Sugasawa et al. | 60/276 |
| 6,401,688 B2 | * 6/2002 | Teraji et al. | 123/295 |
| 6,415,601 B1 | * 7/2002 | Glugla et al. | 60/274 |
| 6,636,797 B2 | * 10/2003 | Yoshizawa et al. | 123/299 |

* cited by examiner

Primary Examiner—Henry C. Yuen
Assistant Examiner—Arnold Castro
(74) Attorney, Agent, or Firm—Julia Voutyras; Allan J. Lippa

(57) ABSTRACT

A multi-cylinder internal combustion engine is described in which each cylinder is capable of operating within a predetermined auto-ignition torque/speed range. Selected cylinders are disabled when the average cylinder torque lies below the auto-ignition torque/speed range so as to raise the torque of the remaining power producing cylinders and enable them to continue to operate within the auto-ignition torque/speed range.

7 Claims, 3 Drawing Sheets

US 6,681,751 B1

ENGINE WITH CONTROLLED AUTO-IGNITION

BACKGROUND OF INVENTION

1. Field of the Invention

The present invention relates to a multi-cylinder internal combustion engine wherein each cylinder is capable of operating with controlled auto-ignition within a predetermined torque/speed range.

2. Background of the Invention

It is possible to operate homogeneous charge internal combustion engines under conditions in which controlled auto-ignition of the charge occurs. This mode of engine operation results in reduced NOx emissions, and improved driveability and fuel economy, and is particularly beneficial during low torque conditions.

One way of achieving controlled auto-ignition is to retain a high proportion of hot residual gases in the combustion chambers. When a new premixed charge is admitted, the residual gases serve to raise the temperature in the combustion chamber to the point where the fuel in the premixed charge ignites spontaneously. When this occurs, combustion commences simultaneously at multiple ignition sites giving a fast burn and even temperature. The even temperature is believed to be responsible for low generation of NOx and the fast burn results in high thermal efficiency.

There is however a minimum ratio of residual gases to fresh intake charge below which auto-ignition cannot occur. This minimum ratio defines the upper torque limit of the auto-ignition range. When torque is low, a high ratio of residual gases to fresh intake is required for auto-ignition to occur. However, with reducing torque, the amount of fuel burned during each cycle is reduced accompanied by a consequent drop in combustion temperature. Eventually a point is reached where the residual gases are too cold to bring about auto-ignition and this defines the lower torque limit of the auto-ignition range.

Under certain conditions, it is possible to operate an engine in auto-ignition mode for a substantial proportion of its running time but nevertheless there may be occasions, such as idling and steady low torque operation, when auto-ignition could yield significantly reduced fuel consumption but these conditions lie below the lower torque limit of the auto-ignition range.

The present invention therefore seeks to increase the proportion of running time that an engine can operate with auto-ignition when operating under low to medium torque conditions.

SUMMARY OF INVENTION

The present invention therefore seeks to increase the proportion of running time that an engine can operate with auto-ignition when operating at low to medium torque.

According to the present invention, there is provided a method for controlling a multi-cylinder internal combustion engine comprising disabling selected cylinders when an average cylinder torque lies below an auto-ignition torque/speed range so as to raise an output torque of the remaining active cylinders and enable them to continue to operate within said auto-ignition torque/speed range.

In order for the torque to remain constant after cylinder disablement, it is essential to increase the charge supplied to the remaining cylinders. In so doing, the operating cylinders are producing higher torque, bringing them within the auto-ignition range. In this way, the invention allows the torque/speed range within which the whole engine may benefit from controlled auto-ignition to be extended to include lower engine torques.

The manner in which the charge to the active cylinders is increased will depend on the manner in which mass airflow is controlled. If the engine has an intake throttle, then the throttle position and the fuel delivered to the active cylinders may be increased in synchronism with the disablement of the cylinders so that there should be no perceptible change in output power. Similar synchronization can also be achieved in an engine in which mass airflow is controlled by the use of variable valve timing.

It is possible to disable selected cylinders in a variety of known ways. For example, it would suffice to disable the fuel supply to the cylinder by deactivating the intake and exhaust valves.

From mapping the operation of the engine, it is possible to determine the torque/speed range within which auto-ignition can be achieved. Hence, it is possible in one embodiment of the invention to disable selected cylinders when the engine is sensed to be operating below this range.

Alternatively, it is possible to measure exhaust gas temperature directly and to resort to cylinder disablement when the temperature drops below a first lower threshold. If the engine is operating with a reduced number of cylinders, all cylinders can again be rendered operative when the exhaust temperature of the working cylinders is sensed to exceed a second higher threshold.

BRIEF DESCRIPTION OF DRAWINGS

The invention will now be described further, by way of example, with reference to the accompanying drawings, in which.

DETAILED DESCRIPTION

Figure 1:
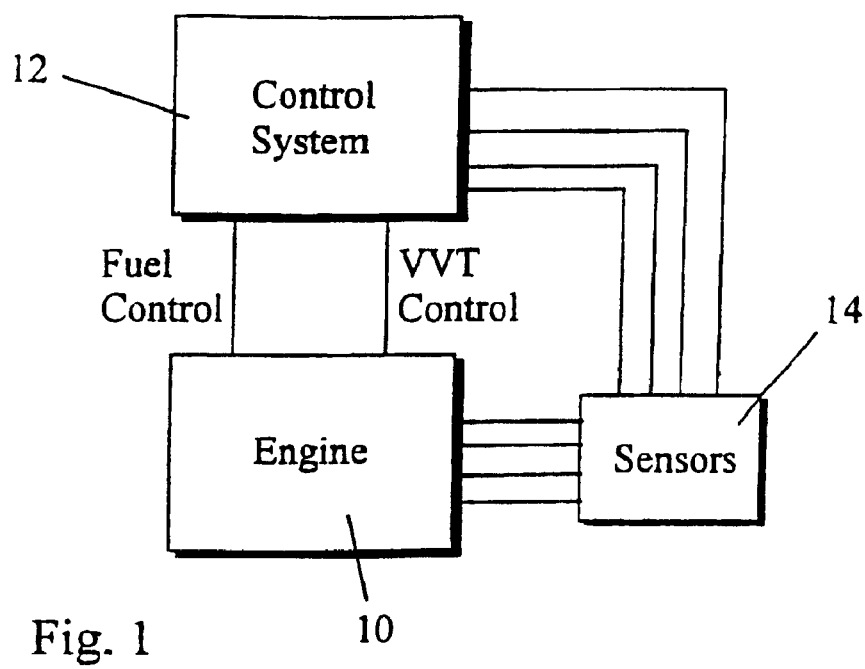
FIG. 1 is a schematic block diagram of an engine embodying the invention.

FIG. 1 shows an engine 10, which is a homogeneous charge internal combustion engine. The engine is controlled by a control system 12, which receives signals from sensors 14 to indicate various operating parameters, such as torque, engine speed, exhaust gas temperature etc. The control system and the engine are generally conventional and do not need to be described in detail within the context of the present invention.

The engine torque can be varied in a conventional manner, such as by use of a throttle valve, but the following description is based on an engine in which camshaft phasing is used to vary the engine output. The engine has two sets of cams, one set for use in the controlled auto-ignition (CAI) mode and the other with conventional charge ignition.

Figure 3:
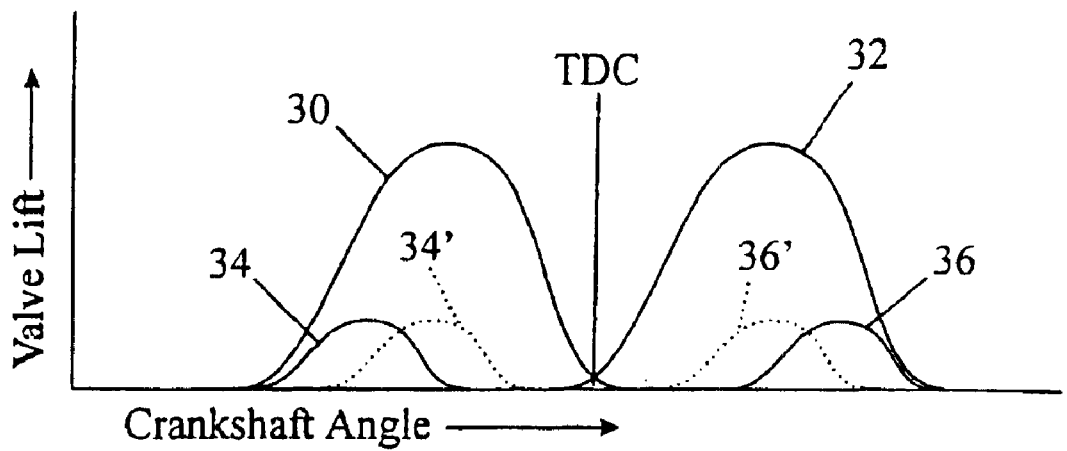
FIG. 3 is a valve timing diagram showing the manner in which the relative phasing to the exhaust and intake camshafts can be used to control the composition of the trapped cylinder charge.

The intake and exhaust valve openings for both sets of cams are shown in FIG. 3. During operation at high load and idling, cams with conventional profiles are used to produce the exhaust valve event 30 and the intake event 32. During operation in CAI mode, the engine is switched (using selectable tappets or cam followers) to cams of a different profile that produce the exhaust event 34 and the intake event 36. These events have a shorter duration and a lower valve lift and they can also be phase shifted relative to the crankshaft to the positions represented by the curves 34" and 36" drawn in dotted lines in FIG. 3.

When the phase of the intake and exhaust camshaft is set to correspond to the curves 34 and 36 in FIG. 3, the exhaust valve is closed early in the exhaust stroke and traps a large proportion of the residual gases within the combustion chamber. This trapped mass of residual gases is compressed by the further movement of the piston, so that the pressure in the combustion chamber rises to a peak as the piston approaches top dead centre (TDC). After TDC, the intake valve remains closed and the trapped gases expand reducing the temperature and pressure in the combustion chamber. Then the intake valve opens to admit a fresh premixed charge that should preferably fill the top of the chamber as the piston travels to its bottom dead centre (BDC) position without mixing significantly with the trapped residual gases from the previous operating cycle. At the end of the compression stroke that follows, the high temperature of the residual gases causes auto-ignition of the fuel in the homogeneous charge.

As the camshaft timing is varied to move the valve events to the position represented by the curves 34" and 36", the exhaust valve closes ever later in the exhaust stroke to trap less and less residual charge and at the same time the intake valve opens ever earlier in the intake stroke to admit more of the premixed charge into the cylinder. In this way, the quantity of homogeneous charge in the cylinder is increased and the quantity of tapped residual charge is decreased to increase the output torque of the engine.

Figure 2:
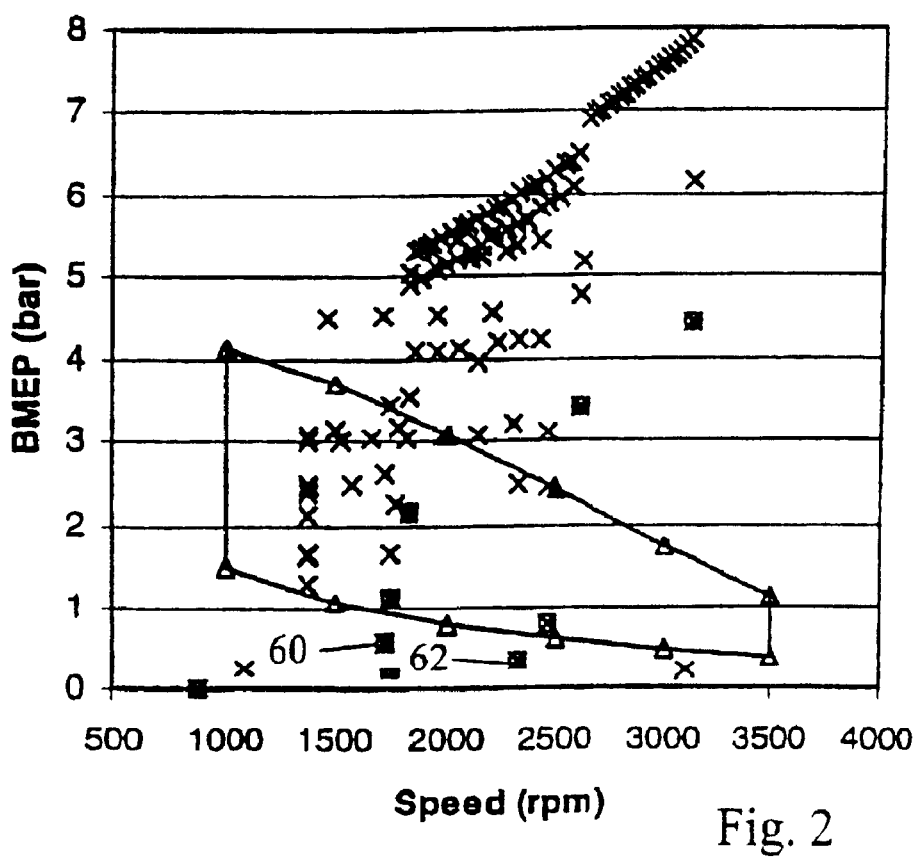
FIG. 2 is a load/speed map showing the region within which controlled auto-ignition can occur.

As earlier explained, controlled auto-ignition can be achieved within a smaller range of the larger torque/speed map of the engine as shown in FIG. 2. Within the area bounded by the closed curve in FIG. 2 passing through points marked by triangles, controlled auto-ignition can be achieved, but outside this area conventional charge ignition must be relied upon. The various crosses on the map represent points at which the engine is operated during an ECE statutory drive cycle. Points represented by a cross and a circle are cruising points which are important because the engine may operate for prolonged periods at these points.

While the CAI mode encompasses an important area of the torque/speed map, it is found that may exclude important cruising points such as, for example, when the vehicle is cruising below 65 mph. These points, designated 60 and 62 in FIG. 2, lie just below the CAI range.

To allow the engine to operate in CAI mode under these conditions, the invention proposes disablement of some of the cylinders at the same time as increasing the torque output of the other cylinders to bring their operation within the CAI range. Though the engine as a whole would in this case have to operate outside the CAI range, the operative other cylinders will be operating within the CAI range, thereby achieving the desired improvements in vehicle driveability and improved fuel economy that result from the improved combustion efficiency. There will be also be a resulting reduction in NOx emissions.

The trigger to disable selected cylinders may be produced in the control system 12 by evaluating if the engine is operating near the lower limit of the CAI range. Alternatively, a direct measurement of exhaust gas temperature can be used for these purposes, since the lower limit of the CAI is the result of the residual gases being too cold to initiate auto-ignition, and the exhaust gas temperature is directly related to the residual gas temperature.

Figure 4:
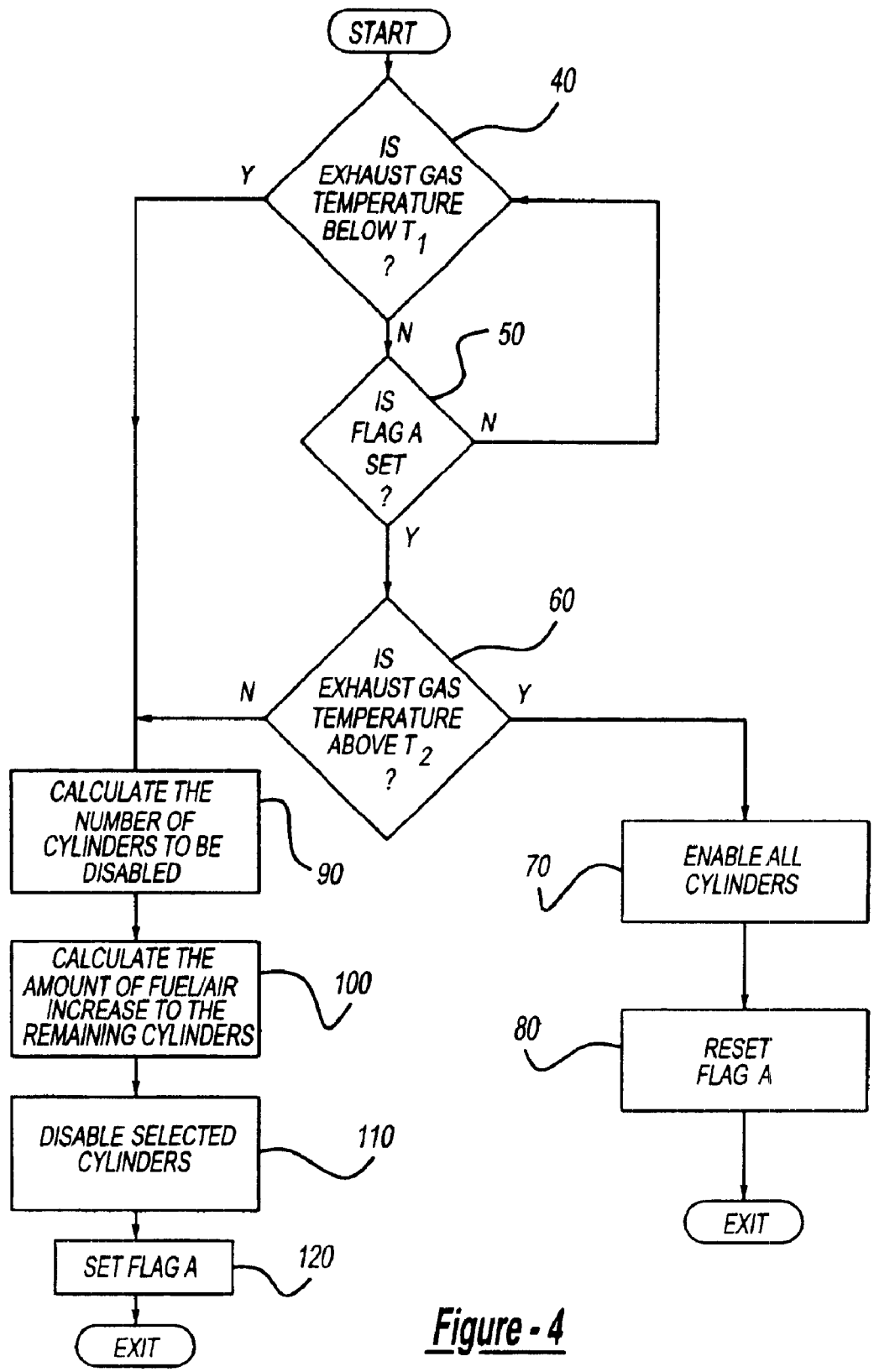
FIG. 4 is a flow chart outlining part of the control algorithm implemented in the control system.

Referring now to FIG. 4, an exemplary routine is described for controlling the engine to bring its operation within the auto-ignition range.

First, in decision block 40, the temperature of the exhaust gases is compared with a lower threshold temperature T1. If the exhaust gas temperature is less than T1 then in block 90 the number of cylinders to be disabled, $Cyl_{dis}$, is calculated according to the following equation:

$$Cyl_{dis} = Cyl_{tot} - rounddown\left(\frac{T_{total}}{T_{cai}}\right)$$

where $Cyl_{tot}$ is the total number of engine cylinders, $T_{total}$ is the total engine output torque, and $T_{cai}$ is minimum per cylinder torque required for achieving the lower CAI limit.

Next, in block 100, the increased amount of fuel and air to be supplied to the remaining cylinders in order to avoid a sudden change in the engine output torque is determined from a predetermined engine map based on minimum per cylinder torque requirements. The routine then proceeds to block 110 wherein cylinder disablement is carried out by cutting off the fuel supply to the selected cylinders and at the same time the fuel and air supplied to the remaining cylinders is increased. The control system 12 in FIG. 1 thus supplies fuel control and VVT (variable valve timing) control signals to the engine to effect cylinder disablement without consequent reduction in engine output power. The increased torque of the operating cylinders will bring them back into the CAI range and their exhaust gas temperature will rise. The routine then proceeds to step 120 wherein flag A is set to signify that some of the cylinders are disabled. The routine then exits.

On the next occasion that the routine of FIG. 4 is called, the exhaust gas temperature will be above T1 but the engine will not be firing on all cylinders and the flag A will be set. The logic flow will in this case pass from decision block 40 through block 50 to block 60 where the exhaust gas temperature will be compared with a higher second temperature threshold T2. The need for T2 to be greater than T1 is to introduce hysteresis and thereby avoid control instability (cylinders being disabled then enabled in consecutive cycles). T2 is also a temperature that is sufficiently high to ensure that the engine as a whole will operate in the CAI range if firing on all cylinders. If the temperature T2 is not exceeded then the engine continues to operate with some cylinders disabled but if temperature T2 is exceeded then in block 70 all cylinders are again enabled (fuel and air supply is resumed to all cylinders) and flag A is reset in block 80.

If T1 is exceeded while the engine is firing on all cylinders then in decision block 50 the flow will return to the start 40 until the temperature again drop below the lower threshold T1.

It should be mentioned that the invention may be applied to compression ignition as well as spark ignition engines. In the former case, during the CAI mode of operation, a homogeneous charge can be injected into the intake port instead of the fuel being injected directly into the combustion chamber.

Therefore, according to the present invention, it is possible to control an engine to operate within the auto-ignition range by monitoring the temperature of the exhaust gas, disabling some of the cylinders in response to the temperature dropping below a predetermined lower threshold, and increasing the amount of fuel and air injected the remaining cylinders so as to maintain the same engine output torque. As a result of this operation, the remaining active cylinders will start operating within the auto-ignition range due to the increase in the residual gas temperature, and the benefits of improved fuel economy and emission control will be achieved.

This concludes the description of the invention. The reading of it by those skilled in the art would bring to mind many alterations and modifications without departing from the spirit and the scope of the invention.

Accordingly, it is intended that the scope of the invention be defined by the following claims:

What is claimed is:

1. A method for controlling a multi-cylinder internal combustion engine comprising disabling selected cylinders when an average cylinder torque lies below an auto-ignition torque/speed range so as to raise an output torque of the remaining active cylinders and enable them to continue to operate within said auto-ignition torque/speed range.

2. A method as claimed in claim 1, wherein to disable selected cylinders, a fuel supply to these cylinders is interrupted at the same time as increasing air and fuel supply to the remaining active cylinders.

3. A method as claimed in claim 2, wherein said air supply to the remaining cylinders is increased by varying the engine valve timing.

4. A method as claimed in claim 1, wherein cylinder disablement is commenced in response to sensing that an exhaust gas temperature has dropped below a first threshold.

5. A method as claimed in claim 4, wherein cylinder disablement is discontinued in response to said exhaust gas temperature of the firing cylinders exceeding a second higher threshold.

6. A method for controlling a multi-cylinder internal combustion engine comprising:

providing an indication that an average cylinder torque is below a predetermined threshold;

in response to said indication, disabling a predetermined number of cylinders; and increasing an amount of fuel and air injection into remaining active cylinders, wherein said increase enables said remaining active cylinders to operate within an auto-ignition torque/speed range.

7. The method as set forth in claim 6 wherein said indication is provided when an exhaust gas temperature is below a preselected value.

* * * * *